April 15, 1952     J. W. BOWERS     2,592,648
COMBINATION WELD CLEANING AND CHIPPING TOOL
Filed Feb. 19, 1948
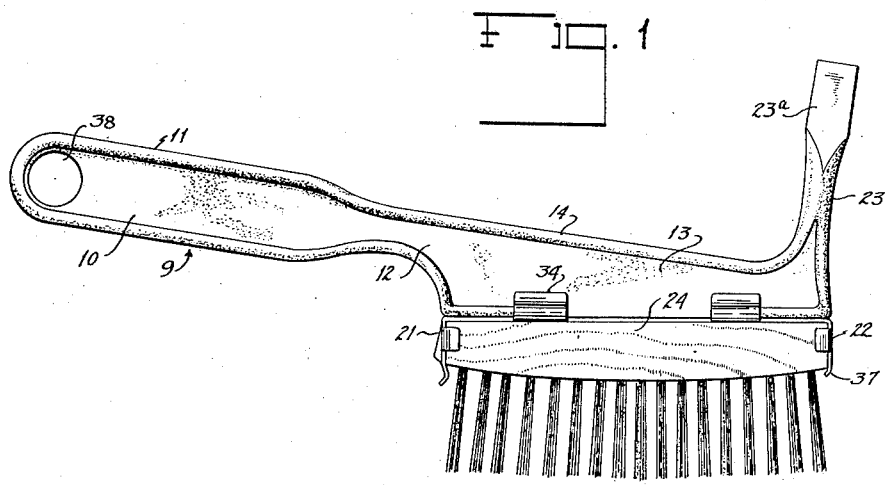
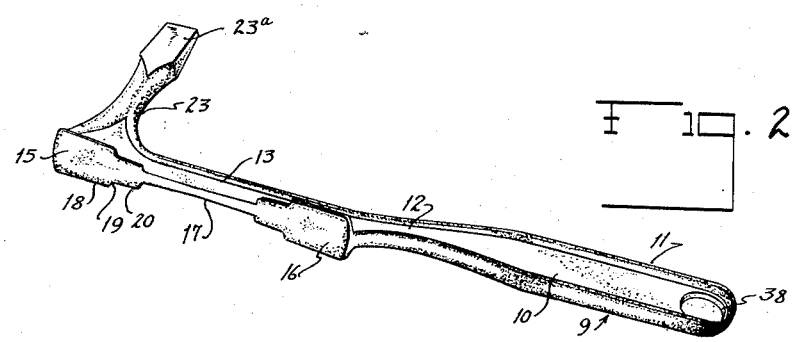
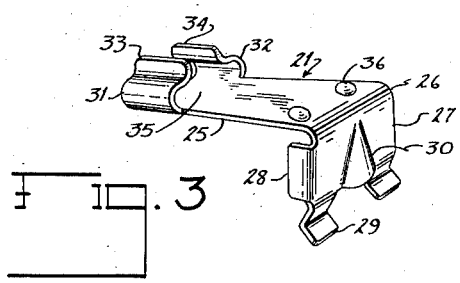
INVENTOR.
JOHN W. BOWERS
BY Joshua R. H. Potts
HIS ATTORNEY Patented Apr. 15, 1952

2,592,648

UNITED STATES PATENT OFFICE 2,592,648

COMBINATION WELD CLEANING AND CHIPPING TOOL

John W. Bowers, Wallingford, Pa., assignor to The Fibre-Metal Products Company, Chester, Pa., a corporation of Pennsylvania Application February 19, 1948, Serial No. 9,454

2 Claims. (Cl. 15—105)

This invention relates in general to weld cleaning tools and more particularly to a combination, dual purpose, weld cleaning tool having means both to chip and to wire brush a surface after the welding operation.

The principal object of the invention is to provide an improved weld cleaning tool, particularly designed and adapted to facilitate the cleaning and finishing of a welding surface subsequently to the welding operation.

Another object is to provide a novel, two-purpose tool, combining in one instrumentality, a chipping means and a wire brush with a view to the convenience of the operator in removing slag and scale after the welding operation.

Another object is the provision of a heavy duty, dual purpose, weld cleaning tool, having novel wire brush receiving means and a chipping chisel which are operatively arranged on adjacent portions of the shank of the tool.

A further object is to provide a combination dual purpose, weld cleaning tool having removable wire brush means, and a heavy duty chipping chisel head.

Other objects and advantages of the novel design and construction will appear more fully hereinafter, and will be best understood when taken in connection with the accompanying drawings, wherein:

Figure 1 is a side elevational view of an embodiment of the invention;

Fig. 2 is a perspective view of the welding tool with the wire brush and the retaining clips therefor removed; and Fig. 3 is a perspective view of one of the brackets or clips employed for securing the brush to the body portion or shank of the tool.

This invention contemplates the provision of a welding tool which will operatively combine in a single implement two separate instruments or means; i. e., a chipping chisel and a wire brush; these two instruments being operatively joined to a handle or shank and so disposed as to permit the operator to optionally apply either to the previously welded surface and in the most convenient manner.

Referring now in detail to the drawings, wherein similar characters of reference indicate corresponding parts in the several views of the preferred form of the invention, the numeral 9 designates the shank or handle of a tool embodying the invention and forming a part of the body portion or web 10. The body portion 10, which is provided on both sides with a marginal beading, is reduced in width, as at 12, and thence prolonged to provide an extension 13 having its upper edge slopingly inclined, as at 14 with the wider end of the extension 13 adjacent to the reduced portion 12. The bottom edge of the extension is formed with a pair of tapering abutments or shoes 15, 16 connected in spaced relation by an adjacent section of the web having its lower edge at that point formed with a beading of reduced cross-sectional area, as at 17.

The abutments or shoes 15, 16 as best shown in Fig. 2, are integrally formed with the lower edge of the web 10 from either side of which their transversely extending opposite edges or margins project. Since the abutments 15, 16 are substantially similar, a description of one will suffice for both. The abutment 15 which is positioned at the outer end of the extension 13, as indicated above, projects transversely from the opposite faces or sides of the web 10 and has its opposite edges tapered or inclined, as at 18, and then shouldered, as at 19, to provide a reduced portion 20 to which one of a pair of brackets or clips, indicated generally at 21, 22, and hereinafter described more fully, is clampingly and detachably secured. The portion 13 of the implement is provided with an integral upwardly extending shank 23 having a chisel or chipping head 23a. The shank 23 of the chipping head, for convenience and efficiency of operation, is preferably arranged in a plane normal to the sloping upper edge of the extension 13.

As an important feature of this invention, a wire brush generally designated at 24, and which may be of conventional design, is operably and detachably fastened to the abutments of the portion 13 by a pair of brackets or clips 21, 22, both of which are formed of or die-stamped from any suitable metal such as steel.

Each of the clips or brackets 21, 22, which are approximately similar, includes a tapered body portion 25, bent downwardly at one end, as at 26, to provide an offset or lug 27 having rearwardly directed tabs 28 on either side, and a pair of spaced angular prongs, as at 29, depending from its lower edge. The offset 27 is also formed with a tapering extrusion or groove 30 on its underside, for convenience of removal of the brackets, when desired.

The other end of the tapered body portion 25 of each of the brackets 21, 22, whose configuration blends with that of the abutments 15, 16, is provided with a pair of spaced, oppositely disposed and mutually inclined arcuate tabs 31, 32, having lips 33, 34. The arcuate space or enclosure, as at 35, between the resilient tabs is adapted to clampingly receive the reduced portion 20 of the abutments 15, 16 while the lips 33, 34, correspondingly receive and clampingly engage the adjacent sides of the web 10. A pair of small bosses or studs, as at 36, protruding from the undersurface of the body portion of the bracket, serve to provide a narrow space or crevice between the lower surface of the abutments or shoes 15, 16 and the adjacent face of the clips or brackets 21, 22. The bracket 22 is substantially similar to the bracket 21 from which it may differ, if desired, by the absence of the key accommodating extrusion 30 and by a lug having a single inwardly directed lip, as at 37, instead of the pair of prongs 29.

In assembling, both of the brackets 21, 22 are applied to the portion 13 of the implement in the spaced relation shown, the inner arcuate edges of the tabs 31, 32 engaging the shoulders 19 of the abutments 15, 16.

The shoulders 19 of the abutments serve as stops to limit and secure the clips or brackets 21 and 22 after the latter have clampingly accommodated the back of the wire brush 24. As best shown in Figure 1, the wire brush has its opposite ends rigidly fastened between the laterally disposed tabs and end prongs of the lugs 27 and the adjacent body portion of the brackets. The wire brush itself functions to press the two brackets 21, 22 apart, thereby maintaining the latter in operative clamping engagement with the portion 13 of the implement while correspondingly clamping and retaining the brush in the position indicated.

When it is desired to remove the brush 24, as for example, to reverse its position after long use, and position less worn bristles of the brush either at the front or rear, and thus prolong or double the life of the brush, a nail, welding rod, or any convenient pointed implement may be inserted into the groove or extrusion 30 and the wire brush pried out. The device is intended to fit into the tool box of the operator, or to be hung by the opening 38 in the handle on the work bench.

The utility and advantages of the dual type welding tool has been in a measure indicated above, but it may be further pointed out that the chipping chisel and the wire brush are arranged in position for immediate use and where their functions may be performed conveniently and efficiently. The oblong portion of the handle is particularly designed and adapted to operatively accommodate the wire brush so that the latter may be conveniently removed and reversed; i. e., its front end turned to occupy the position of the rear end and vice versa. This expedient will prolong the life of the brush, after it has been used for some time and the bristles worn at one end more than the other.

When it is desired to replace the brush after long use, the latter is removed from its position between the brackets and a new brush substituted therefor, the said brackets then being maintained in the position illustrated and wherein they retain the brush in operative position.

It is to be understood that the invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention; and it will be further understood that each and every novel feature and combination present in or possessed by the mechanism herewith disclosed, forms a part of the invention included in the application.

What I claim is:

1. In a combination weld cleaning tool of the kind described, a handle, an extension on said handle, said handle and extension comprising a web and a peripheral bead, a pair of abutments integral with said extension and arranged in a plane substantially normal thereto, a pair of brackets removably carried by said abutments, means on said brackets to clampingly and detachably secure a wire brush therebetween, and a chisel member constituting an integral continuation of the peripheral bead on said extension.

2. In a combination weld cleaning tool of the kind described, a handle, an extension on said handle, said handle and extension comprising a web and a marginal bead flanged abutment members on said extension, brackets removably fitted on said extension, each of said brackets having clamping elements engaged with said abutment members, a wire brush secured to said brackets, and a chipping chisel constituting an integral continuation of the marginal bead on said extension and protruding substantially normally therefrom, said wire brush being located in a position substantially opposite to that of said chisel.

JOHN W. BOWERS.

REFERENCES CITED

The following references are of record in the file of this patent:

UNITED STATES PATENTS

| Number | Name | Date |
|---|---|---|
| 267,077 | Hart | Nov. 7, 1882 |
| 366,439 | Troy | July 12, 1887 |
| 1,162,928 | Jansson | Dec. 7, 1915 |
| 1,693,330 | Astley | Nov. 27, 1928 |
| 1,767,349 | Cross | June 24, 1930 |
| 2,226,673 | St. Pierre | Dec. 31, 1940 |
| 2,293,081 | Savoy | Aug. 18, 1942 |
| 2,368,988 | Honhart | Feb. 6, 1945 |

FOREIGN PATENTS

| Number | Country | Date |
|---|---|---|
| 24,478 | Great Britain | of 1909 |
| 389,669 | Great Britain | Mar. 23, 1933 |